United States Patent [19]

Konstant et al.

[11] Patent Number: 4,462,500

[45] Date of Patent: Jul. 31, 1984

[54] MULTIPLE LOCATION STORAGE BAYS

[75] Inventors: Anthony N. Konstant, Winnetka; John J. Weider, Arlington Heights, both of Ill.

[73] Assignee: Speedrack, Inc., Skokie, Ill.

[21] Appl. No.: 379,638

[22] Filed: May 19, 1982

[51] Int. Cl.³ .............................................. A47F 5/00
[52] U.S. Cl. .................................. 211/151; 211/162; 414/276
[58] Field of Search ...................... 211/151, 49 D, 191, 211/162; 248/429, 430, 420; 414/276, 233, 235, 234

[56] References Cited

U.S. PATENT DOCUMENTS

| | | | |
|---|---|---|---|
| 3,465,894 | 9/1969 | Setecka | 211/129 |
| 3,567,039 | 3/1971 | Evans | 211/162 |
| 3,757,967 | 9/1973 | Colbridge | 211/151 X |
| 3,945,510 | 3/1976 | Saul et al. | 211/162 X |
| 4,155,462 | 5/1979 | Bendel | 211/151 |
| 4,341,313 | 7/1982 | Doring | 211/151 |

FOREIGN PATENT DOCUMENTS 1122446 1/1962 Fed. Rep. of Germany ...... 211/151

Primary Examiner—Ramon S. Britts
Assistant Examiner—Robert W. Gibson, Jr.
Attorney, Agent, or Firm—Fitch, Even, Tabin & Flannery

[57] ABSTRACT

Storage racks include bays for accepting three loads of goods from an open front end wherein telescoping upper and lower trolleys move along a track assembly from the front of the bay rearward. The upper and lower trolleys are successively loaded, and they are moved rearward to rear and central locations as each following load is inserted, with a third load of goods being located on the track assembly in front of the two loaded trolleys. The track assembly is inclined downward toward the front of the bay, and catches are associated with the track assembly to prevent return movement of the loaded trolleys to the front of the bay until released.

11 Claims, 7 Drawing Figures

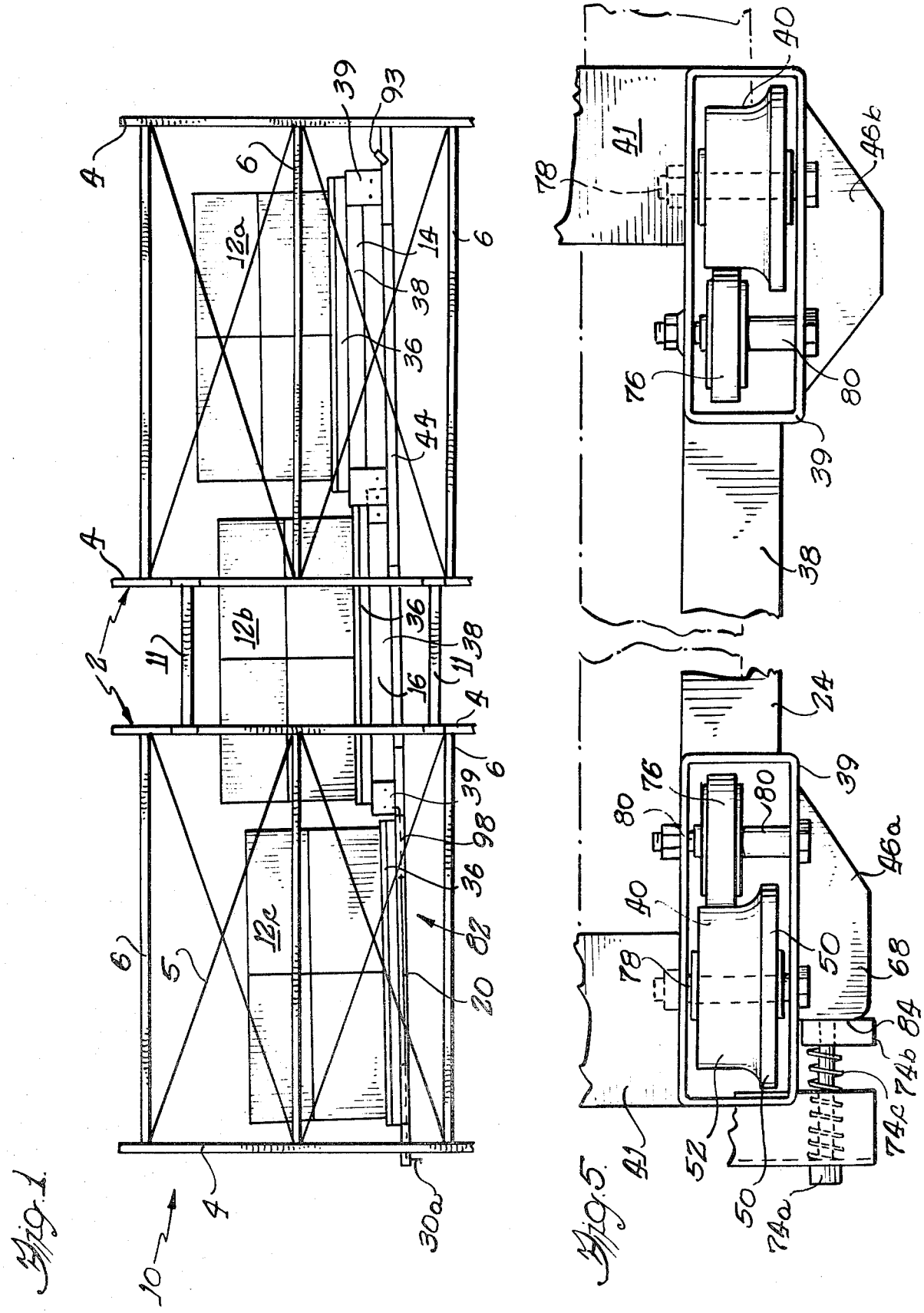

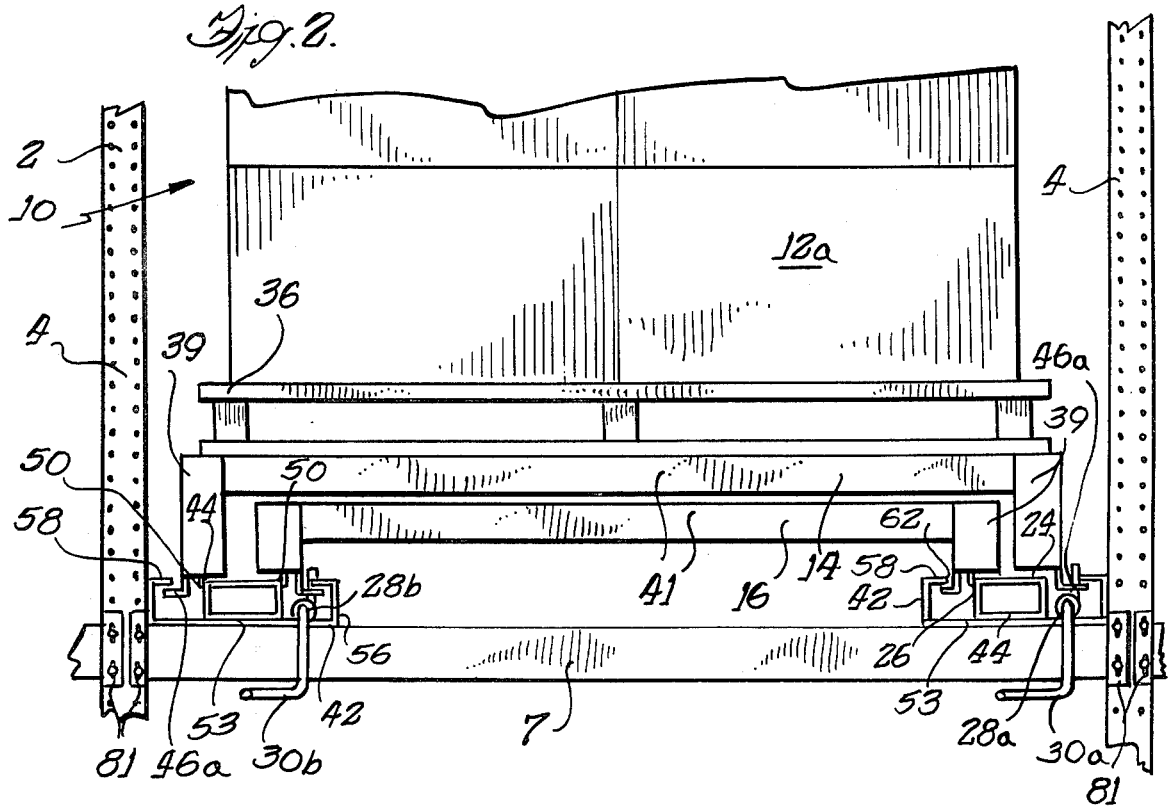
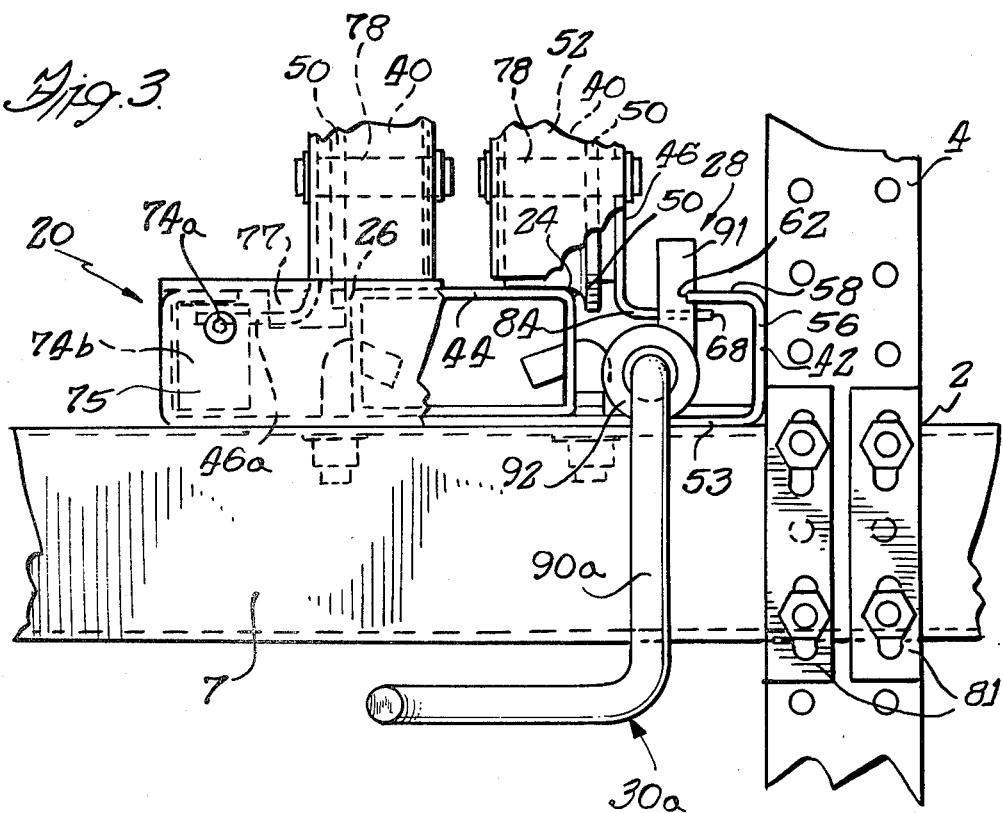

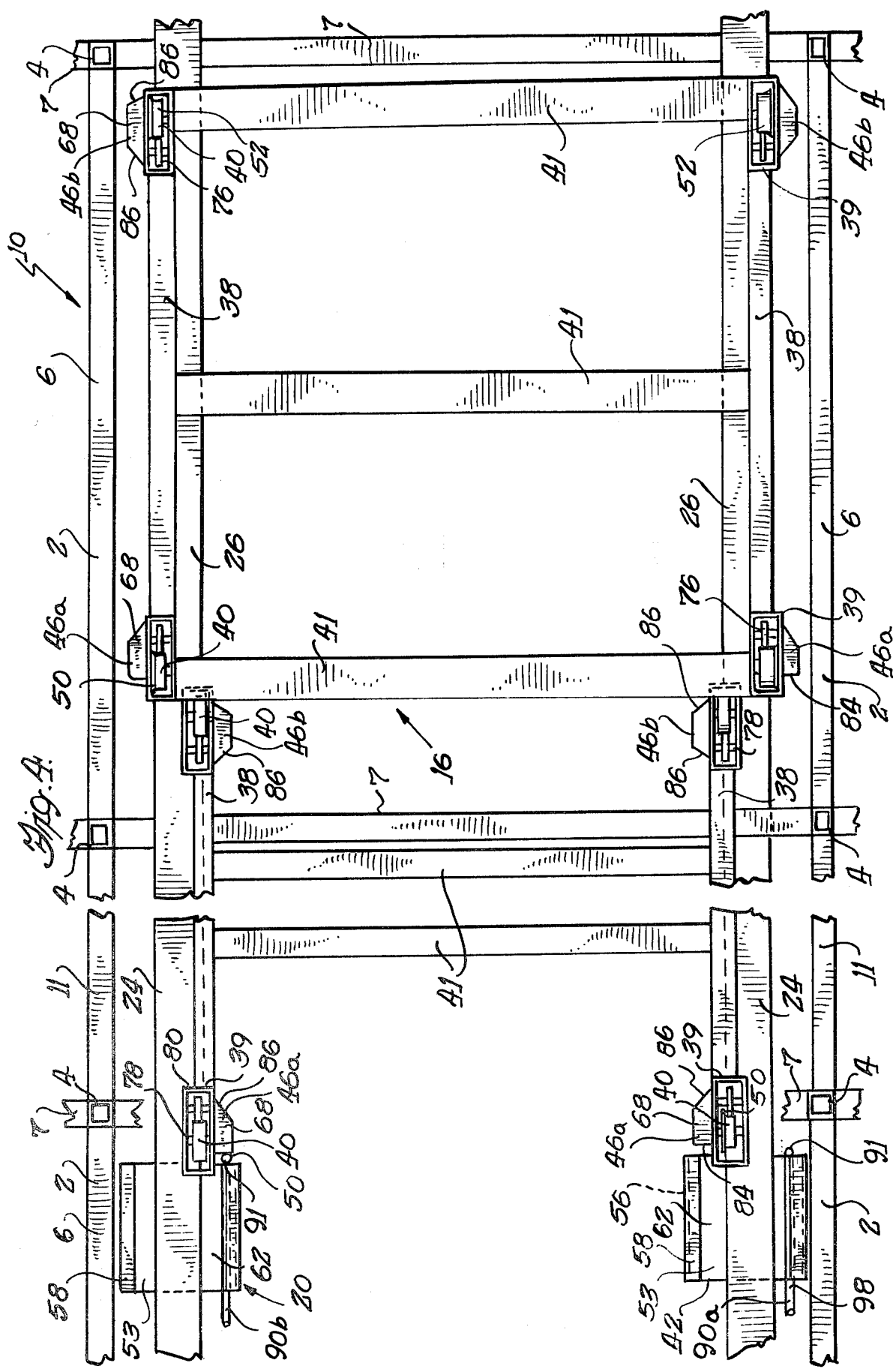

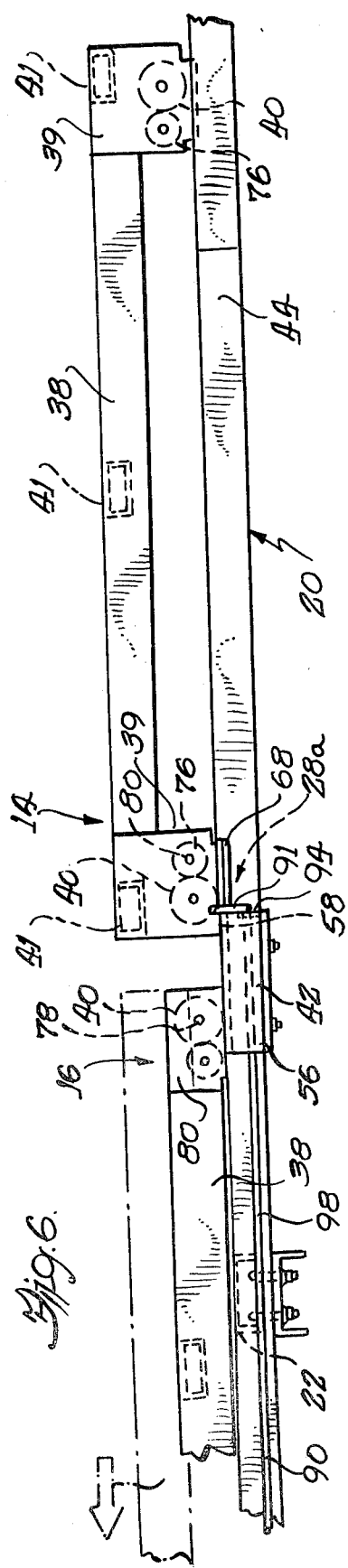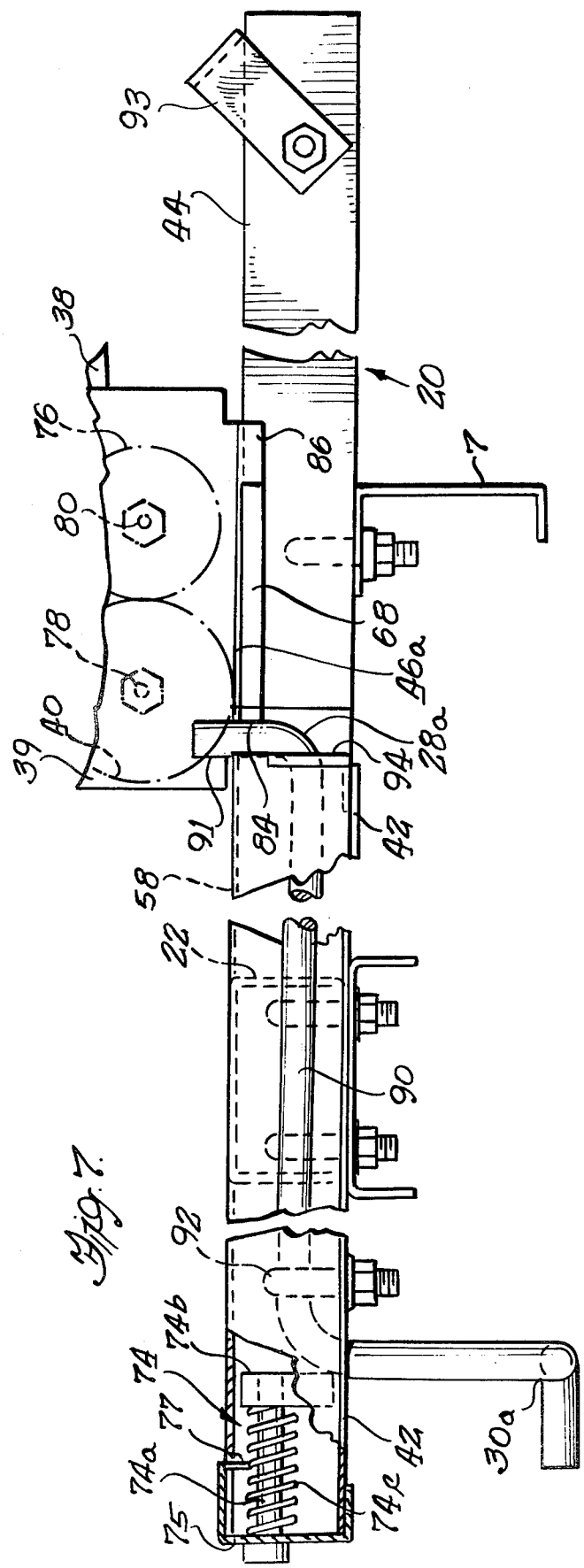

1

MULTIPLE LOCATION STORAGE BAYS

The present invention relates to warehouse storage arrangements and more particularly to storage racks having superimposed bays for each holding multiple loads of goods.

BACKGROUND OF THE INVENTION

A convenient method of warehousing goods is to stack goods on pallets and insert the loaded pallets into storage bays using fork lift trucks or the like. A common warehouse arrangement has a pair of back-to-back arrays with each array facing an aisle. Each array includes a plurality of storage bays in horizontal and vertical rows. It is recognized that a warehousing arrangement which requires one aisle for two arrays, each one load deep, is wasteful of floor space, and storage racks have been proposed having greater depth whereby loads may be stored at more than one location within each bay.

U.S. Pat. No. 4,155,462 discloses storage racks for receiving two loads of palleted goods through a front end, thereby essentially doubling the amount of storage area associated with each aisle. A first load of goods is placed upon a trolley in the storage bay, and the loaded trolley is moved rearward along a track to an inner location when a second load is inserted in the same bay. The trolley, which is biased forward by resilient means, returns its load to the front location of the bay when the second load is removed.

In the system described in U.S. Pat. No. 4,155,462, the weight of the second load prevents the forward return movement of the trolley until it is removed. It is recognized in the '462 patent that a light load in front of the trolley may be insufficient to prevent forward movement of the trolley; however, as the system is intended for use in warehouses of large capacity, this danger is dismissed as minimal. While the danger of a forward-biased trolley pushing a fully loaded pallet into the aisle may be minimal, such may not be the case when a pallet is nearly empty. In many warehouse facilities, goods will frequently be individually picked from a loaded pallet rather than withdrawn as an entire pallet load. If the load becomes sufficiently light, a forward-biased trolley may dislodge the pallet and shove it and the remaining goods into the aisle.

SUMMARY OF THE INVENTION

The improved storage rack has bays which each hold three loads of goods. Each bay has an outer track and an inner track which run from its open front end rearward and carry an upper trolley and a telescoping lower trolley. A first load is placed on the upper trolley which is later moved rearward when a fork-lift truck delivers a second loaded pallet and places it on the lower trolley. Both loads are later moved rearward as a third load of goods is placed upon stationary rails at the front location of the bay. To facilitate unloading, the tracks are inclined toward the front whereby gravity will cause the trolleys to roll forward. Catches associated with the outer and inner tracks hold the upper and lower trolleys at the center location of the bay until released.

BRIEF DESCRIPTION OF THE DRAWINGS

FIG. 1 is a side elevation view of a three-location storage bay embodying various features of the present invention;

FIG. 2 is a front elevation view of the storage bay of FIG. 1 shown with the front stops and bumpers removed and with both trolleys shown in the front location;

FIG. 3 is an enlarged fragmentary front view of one of the track assemblies of the storage bay with parts broken away and with the upper trolley shown in the center location;

FIG. 4 is an enlarged plan view of the two trolleys in the locations shown in FIG. 1 with the loads removed;

FIG. 5 is an enlarged fragmentary plan view of the wheel assembly of the upper trolley in the position shown in FIG. 2 with the hold-down bracket removed;

FIG. 6 is a side elevation view of the trolleys in the locations shown in FIG. 3 on the inclined tracks; and FIG. 7 is an enlarged side elevation view of the trolley track assembly and the associated catch mechanism.

DETAILED DESCRIPTION OF THE PREFERRED EMBODIMENTS

Illustrated in FIG. 1 is a storage rack assembly which includes a plurality of fore-and-aft extending frames 2 that are formed from vertical posts 4 rigidly interconnected by X-bracing 5 and straight braces 6. The frames 2 are connected by longitudinal beams or stringers 7 into a three-dimensional, stable framework or rack structure which may extend from the floor to the roof of a warehouse and provides a number of superimposed storage locations. A large number of parallel frames 2 are used, which are uniformly spaced from one another by the stringers 7 to create a large number of vertical rows, each of which includes several superimposed storage bays 10. A single bay 10 is shown which is defined on each lateral side by a pair of aligned frames 2 that may be linked together by tie bars 11 or may be interconnected only by the tracks as described hereinafter. Each bay is capable of holding three loads of goods: one load 12a carried by an upper trolley 14 at the rear end of the bay, one load 12b carried by a lower trolley 16 at the center of the bay and one load 12c supported on a track assembly 20 for the trolleys or upon a pair a cross supports 22 (FIG. 6) at the front location of the bay. The trolleys are movable along the track assembly 20 from the front of the bay rearward to allow successive loads to be supplied through the open front end of the bay which is at the lefthand edge of FIG. 1.

In accordance with the present invention, each horizonally extending storage bay 10 can store three pallet loads 12 of goods and includes an outer track 24 and an inner track 26 extending from the front end rearward, along which the telescoped upper and lower trolleys 16, 16 travel independently of each other. With both trolleys initially at the front end, a first load 12a is placed on the upper trolley 14. The loaded upper trolley is moved or pushed rearward as a second load 12b of goods is inserted and placed on the lower trolley 16. Finally, when a third load 12c is inserted through the front end of the track assembly 20, both loaded trolleys are pushed rearward, with the upper trolley 14 moving to a rear location in the bay and the lower trolley 16 to a central location. To empty the bay 10, the procedure is reversed.

The track assembly 20 is inclined downward toward the front end of the bay whereby gravity causes the trolleys 14, 16 to tend to roll toward the front; however, catches 28a, 28b associated with the track assembly 20 optionally prevent a trolley from moving forward from the central location until released. Release means 30a, 30b (FIG. 2) upon actuation disengage the appropriate catch 28a, 28b allowing one or both of the trolleys to roll forward along the track assembly.

The superimposed bays 10 of the storage rack assembly are generally defined by the track assemblies that are supported from the vertical frames 2 and the horizontal stringers 7. The width of each bay 10 is somewhat greater than the width of a standard pallet 36. Each bay has sufficient height to accommodate a loaded pallet carried upon the upper trolley and is slightly greater than 3 pallets deep.

The trolleys 14, 16 are preferably formed of welded-together tubular members of rectangular cross section and are designed to facilitate the support of a standard pallet thereatop. Wheels 40 of the trolleys rotate on axles 78 mounted in short vertical tubular members 39 at the four corners, and the two corner tubular members 39 on each lateral side are interconnected by lateral tubular members 38. The lateral tubular members 38 are interconnected by cross tubular pieces 41 having upper surfaces at the same level as the upper surfaces of the of the lateral tubular members 38, thereby defining a load-supporting surface. Loads 12 disposed on pallets 36 having their fork-entry openings facing fore-and-aft are supported on the upper surfaces of the tubular members 38 and 41. Decking (not shown) can be applied atop the tubular members should it be desired to store loads disposed on slip-sheets or the like.

The track assembly 20 includes a pair of tubular beams or rails 44 extending fore-and-aft for generally the length of the bay which rails are mounted on the horizontal stringers 7. Upwardly open C-shaped channel sections 42, which are more than twice as wide as the rails (FIG. 3), serve a hold-down function and are placed at the front end of each rail and at a strategic central location within. The inner and outer edges of the top surfaces of the rails 44 provide the inner and outer tracks 26, 24 along which the wheels 40 of the lower and upper trolleys 16, 14 roll, and the channels 42 cooperate with hold-down brackets or retainers 46 carried by the trolleys to prevent derailment of the trolleys during loading or unloading of a palletized load by a fork lift or the like.

Each of the rails 44 has rounded edges, and each of the wheels 40 has a flange 50 which extends below the upper surface and along the side of the rail and has a rolling surface 52 matched to the rounded edge of the rail. The flanges 50 of the upper trolley wheels lie 40 laterally outward with respect to the track assembly while the flanges 50' of the lower trolley wheels 40' lie inward.

The hold-down channels 42 are placed at the positions of the wheels 40 at the front trolley location. Each C-shaped channel 42 has a lower web 53, which is disposed between the undersurface of a rail 44 and one of the horizontal stringers 7, a pair of upstanding flanges 56 at the lateral edges thereof and a pair of inturned edges 58. The inturned edges 58 of each channel are generally at the horizontal level of the upper surface of the rail and are spaced laterally from the rail 44 providing a pair of slots 62 along each side of the rail which accommodate the wheel flanges 50 and hold-down brackets 46. The hold-down brackets 46 depend from the the lower edges of each rectangular tube member 39 in which the wheels 40 are mounted, and each terminates in an horizontal section 68 which is located under the corresponding inturned edge 58. The hold-down brackets 46 prevent derailment of a trolley which may inadvertantly result during loading or unloading by a fork-lift truck or the like because the horizontal sections 68 at each of the four corners of both trolleys are under the inturned flanges 58 when they are in the front location, and the possibility of the trolley wheel bouncing off of the track during supply of a load which might be dropped into either trolley is also eliminated.

To assure that both of the trolleys 14, 16 are located at the open front end of the bay 10 whenever they are empty and to facilitate recovery of the loads 12a,b located at the center and rear of the bay, the track assembly 20 is preferably inclined downward toward the front at an angle of between about 3° and about 6°. Each of the trolleys rolls by gravity along the inclined track assembly until the trolley in the front location hits spring-loaded bumpers 74 (FIGS. 5 and 7) at the front of the track assembly 20. The bumpers 74 include socket-head shoulder bolts 74a which fit thru openings provided in front end brackets 75 that are welded or suitably otherwise affixed to the C-shaped channels 42. The bolts screw into tapped holes in rectangular pads 74b, and compression springs 74c surround the bolts 74a. Two bumpers are within each of the front channel sections 42 in flanking relationship to the front end of each rail 44.

Although it is desirable that the trolleys roll freely to the front of the bay 10 when not restrained by the catches 28, they should not pick up excess speed in so doing lest a sudden stop, against the bumpers 74 and back-up depending stops 77 (FIG. 7), at the front of the bay cause the goods to shift forward and possibly fall from the trolleys. Accordingly, brake means to slow down the trolleys may optionally be provided in the form of hysteresis wheels 76 in contact with each of the trolley wheels 40. Each of the trolley wheels 40 is mounted on an independent axle 78 supported from the lateral sides of the rectangular tubular member 39, and an associated hysteresis wheel 76 is mounted on an axle 80 similarly supported in the lateral sides of the tubular member 39. The hysteresis wheels 76 are formed of soft, resilient material, such as a soft synthetic rubber, and are mounted to press against the rolling surfaces of the metal trolley wheels 40 as they turn but mounted so as not to contact the track surface. The pressure of the hysteresis wheels is sufficient to retard the trolleys from accelerating. Alternatively, the slope of the track can be lowered slightly so the trolleys will not have a tendency to move quite as fast, and in this respect, the stringers 7 are preferably mounted upon the posts 4 with infinitely adjustable connectors 81 (FIGS. 2 and 3) of the type described in U.S. Pat. No. 3,877,579, issued Apr. 15, 1975 to John J. Weider, see FIG. 2.

Whereas, in the bay described in the above-mentioned U.S. Pat. No. 4,155,462, the weight of a load in front of a trolley was relied upon to hold the forward-biased trolley from prematurely moving back to the front location and dumping the load thereinfront, the present invention employs a positive catch 28 to maintain a trolley in the center position until released. These positive catches assure that the trolleys will not push a load disposed in the front position into the aisle. This optional feature is particularly important when items; of goods are picked one-by-one from the pallets 36 in the front location rather than withdrawn only by pallet load.

A preferred catch-release mechanism, indicated generally at 82, cooperates with the hold-down brackets 46 to limit forward movement of the trolleys 12, 14. The hold-down brackets 46a associated with the front wheels 40 of each of the trolleys have front edges 84 perpendicular to the lateral edges of the trolleys and have chamfered rear edges 86, whereas the hold-down brackets 46b associated with the rear wheels have chamfered front and rear edges 86. Preferably cut at an angle of 30° to 60°. One-piece elongated catch release rods 90 are bent upward at their back ends to form short vertical tangs 91, which serve as the catches 28 to engage a perpendicular front edge 84 of one of the front hold-down brackets 46a of one of the trolleys 14, 16. The rods are bent downward and forward at their front end to form the release handles 30. An elongated central segment 98 of the catch release rod 90 extends alongside the rail 44. The front portion of this segment 98 is supported in an eye 92 (FIG. 7), and the rear end of the segment of the rod adjacent the tang 91 is rotatably within an apertured bracket 94 carried at the rear of the C-shaped channel 42. The handle 30 is bent generally perpendicularly downward from the elongated central segment 98 and then to the left and forward as shown in FIGS. 3 and 7.

The release rod 90 rotates freely within the eye 92 and apertured bracket 94 and is biased in a counter-clockwise direction (in reference to FIG. 3) by the weight of the release handle 30, which projects to the left toward the rail 44 so that the catch 28 extends substantially vertically and is directly in the path of the horizontal section 68 of the hold-down bracket 46. The short perpendicular tang 91 of the catch 28 engages the perpendicular front edge 84 of the hold-down bracket 46a associated with one of the front wheels of a trolley which prevents the trolley from moving forward until released, as shown in FIGS. 3, 6 and 7. However the catches 28 do not interfere with either the rearward movement of the trolleys or the forward movement of the hold-down bracket 46b associated with the rear wheels 40 because these edges 86 of the horizontal sections 68 are chamfered at an angle of about 30° to about 60° and push the tang 91 to the side and out of the way as the catch-release rod 90 rotates clockwise. Either trolley is manually released by turning the handle 30 to rotate the catch-release rod 91 in a clockwise direction until the tang 91 loses contact with the front hold-down bracket 46a.

The right hand catch-release handle 30a is associated with the catch 28a which engages the front hold-down bracket 46a of the upper trolley 14 (FIG. 6), and the lefthand catch-release handle 30b is associated with the catch 28b which engages the front hold-down bracket 46a associated with the lower trolley 16. Although both catch-release rods 90 could be on the same side of the bay 42, it is deemed preferable to have the rods on opposite sides so as to allow the rods to be identical in construction and thus interchangable. The catches 28 hold either the upper trolley 14 or the lower trolley 16 at the center location at least one pallet length from the front of the bay. After the load in the front location is removed, the trolley in the center location is manually released for forward travel by turning the appropriate release handle 30 clockwise.

To facilitate better understanding of the invention, a load supplying and load withdrawing sequence is now described. With the bay 10 empty and the upper and lower trolleys 14, 16 at the front end of the bay, a fork lift inserts a loaded pallet 36 onto the upper trolley 14. (as depicted in FIG. 2).

Thereafter, the fork lift inserts a second loaded pallet into the open front end at a level so that the pallet 36 of the second load 12b engages the front edge of the upper trolley and pushes it and the first load 12a rearward to the center location generally at the middle of the bay, at which time the second load 12b is lowered onto the lower trolley 16. The right hand catch 28a is deflected clockwise twice as chamfered hold-down horizontal sections 68 move past the tang 91, which then rotates back into position and blocks the perpendicular front edge 84 as shown in FIG. 3.

Finally, the third load 12c is inserted by the fork lift through the open front end of the bay at a level so it engages the front edge of the lower trolley 16 and pushes it rearward which, in turn, pushes the upper trolley 14 rearward to the rear location. Wheel stops 93 at the back ends of the rails 44 prevent the rear trolley 14 from being pushed through the rear end of the bay. As the lower trolley 16 is pushed to the center location, the chamfered back edges of the trolley hold-down brackets 46b, 46a momentarily push the left hand catch 28b aside while passing. The rod 90b returns counter-clockwise by the weight of the handle 30b until the tang 91 is in its upright position where it engages the perpendicular front edge 84 of the front hold-down bracket 46a on the lower trolley 16 when it rolls slightly forward. The third load 12c is then lowered either directly onto the rails 44 in the front location or onto a pair of cross-rails 22 installed therebetween.

When the loaded goods are needed, they are removed from the bay beginning with the third or front load 12c. Either the entire front pallet may be removed with a fork lift or items may be picked one-by-one and the pallet removed after the last item has been removed. With the catches 28b engaged with the front hold-down bracket 46a, the lower trolley is restrained from forward motion until the release handle 30b manually rotated upward. Thus, after removal of the front load 12c, the trolleys 16 and 14 remain in the middle and rear locations. To bring the loads 12b and 12c forward, the release handle 30b is turned clockwise disengaging the catch 28b from the hold-down bracket 46a of the lower trolley 16. As the lower trolley 16 and the upper trolley 14 roll forward to the front location, the chamfered front surface of the horizontal section 68 of the rear hold-down bracket 46b pushes the associated catch 28b aside as it rolls past; however, the right hand catch 28a is not disturbed and halts the upper trolley 14 when the perpendicular front edge reaches it. After the second load 12b has been removed, the upper trolley 14 carrying the first load 12a is released for forward travel and unloading by rotating the handle 30a clockwise. When either loaded trolley reaches the front end, its momentum is absorbed by the spring-loaded bumpers 76.

The trolley arrangement of the present invention provides for the quick visual determination of the number of loads within the bay. Two trolleys 14, 16 at an empty front end indicates an empty bay 10. Two trolleys at the front of the bay with a load 12a on the upper trolley or a single unloaded trolley 16 at the front of the bay indicates one load in the bay. No trolleys in an empty front end of the bay or a loaded lower trolley at the front of the bay indicates two loads 12a and 12b in the bay. No trolleys and a load 12c in the front of the bay 10 indicates a bay fully loaded with three loads.

While the invention has been described in terms of a preferred embodiment, modifications obvious to one having ordinary skill in the art may be made without departing from the scope of the present invention. Alternative catch mechanisms might be used to restrain forward movement of the trolleys. The trolleys and the bays may be constructed having twice the depth so that each of the trolleys will support two palletized loads. Such a construction wherein six loads may be accommodated in each bay is feasible when reach-type fork lift trucks are employed that can extend forward to set a load upon the rear half of such a deeper trolley.

Various features of the invention are emphasized in the following claims.

What is claimed is:

1. In a storage rack having bays for receiving at least two loads in a front location and at least one location rearward thereof, each bay comprising:
    an open front end through which loads may be supplied and withdrawn,
    rail means extending from said front location to said rearward location and being inclined downwardly towards said front end,
    trolley means for carrying a load, said trolley means being mounted on said rail means for movement therealong,
    catch means associated with said rail means for preventing forward movement of said trolley means when in said rearward location but permitting rearward movement of said trolley means when in said forward location,
    means to release said catch means, and
    means for supporting a load at said front location when said trolley is moved to said rearward location.

2. The invention according to claim 1 wherein said trolley means has retainer means extending laterally outwardly therefrom and wherein interengagement means is disposed adjacent said rail means at said front location which blocks upward movement of said retainer means and prevents derailment of said trolley means during loading and unloading of said trolley means.

3. The invention according to claim 2 wherein said rail means is formed by a pair of parallel, spaced-apart beams each having a flat upper surface with spaced apart edges, the outside edges of said beams providing an outside track for said trolley means and the inside edges providing an inside track, and
    second trolley means for movement along said inside track proportioned to fit beneath and inside of said trolley means.

4. The invention in accordance with claim 2 wherein said retainer means comprises retainers depending from front and rear locations along both sides of said trolley means, certain of said retainers having their rear edges formed at an angle between about 30° and about 60° for engaging and deflecting said catch means, and said interengagement means has flanges spaced laterally from said beams in flanking relationship thereto and overlying said retainers.

5. The invention in accordance with claim 4 wherein certain of said retainers have abutment means formed at the front edge thereof for cooperating with and abutting said catch means which is disposed alongside said rail means.

6. The invention in accordance with claim 5 wherein each bay further comprises a spring bumper positioned for engagement with the abutment means of one of said retainers to cushion and slow said trolley means as it moves to said front location.

7. The invention according to claim 3 having first catch means associated with said inside track to prevent forward movement of said second trolley means from a first rearward location, means to release said first catch means, second catch means associated with said outside track to prevent forward movement of the first mentioned trolley means from a second rearward location, and means to release said second catch means.

8. The invention as set forth in claim 7 wherein each catch means comprises a release rod rotatably carried in the bay and extending rearwardly from said front location, said rod at its rear end having an upstanding tang for engaging a retainer means of a trolley means to maintain that trolley means in its rearward position, said rod at its front end having a handle to enable the operator to rotate said tang out of the path of the retainer means to permit the force of gravity to move the previously maintained trolley means to said front location.

9. The invention according to claim 1 having means associated with wheels on said trolley means to slow the forward movement of said trolley means along said tracks.

10. The invention as set forth in claim 9 wherein the slowing means comprises a hysteresis wheel mounted adjacent a trolley means wheel so that the peripheries of the two wheels engage.

11. In a storage rack having bays for receiving three loads in a front location and having a rear location and an intermediate location, each bay comprising:
    an open front end through which said loads may be supplied and withdrawn;
    a pair of parallel, spaced-apart beams extending from said front location to said rear location and being inclined downwardly towards said front end, each beam having a flat upper surface with spaced apart edges, the outside edges of said beams providing an outside track and the inside edges providing an inside track;
    a first trolley for carrying a first load mounted for movement on said outside track between said front location and said rear location;
    a second trolley for carrying a second load mounted for movement on said inside track between said front location and said intermediate location, said second trolley being proportioned to fit beneath and inside said first trolley;
    means for supporting a third load at said front location when the two trolleys have been moved rearwardly;
    each trolley having a pair of laterally outwardly extending rear retainers and a pair of laterally outwardly extending front retainers said rear retainers having angled front and rear deflection surfaces, certain of said front retainers having angled rear deflection surfaces and front abutment surfaces extending substantially normal to the path of travel of said trolleys;
    hold down brackets overlying said retainers to prevent upward movement of said trolleys from said beams;
    a spring bumper positioned for engagement with one of said front retainers for cushioning and slowing a trolley as it approaches said front location;
    a catch means for each trolley to maintain the trolley remote from said front position until its return is called for, said catch means comprising a rotatable release rod carried extending rearwardly from said front location, said rod at its rear end having an upstanding tang for engaging an abutment surface of one of said front retainers, said rod at its front end having a handle to enable the operator to rotate said tang out of the path of the front retainer to permit the force of gravity to move the corresponding trolley to said front location; and a hysteresis wheel carried by each trolley adjacent one of its wheels and in peripheral engagement therewith to limit the speed of the trolley.

* * * * *